A. & J. EXTON.
Cracker-Machine.

No. 164,283.  Patented June 8, 1875.

WITNESSES:
W. W. Hollingsworth
Amos W. Hart

INVENTORS:
Adam Exton
John Exton
BY
ATTORNEYS.

THE GRAPHIC CO. PHOTO-LITH. 39 & 41 PARK PLACE, N.Y.

UNITED STATES PATENT OFFICE.

ADAM EXTON AND JOHN EXTON, OF TRENTON, NEW JERSEY.

IMPROVEMENT IN CRACKER-MACHINES.

Specification forming part of Letters Patent No. 164,283, dated June 8, 1875; application filed March 30, 1875.

CASE C.

*To all whom it may concern:*

Be it known that we, ADAM EXTON and JOHN EXTON, of Trenton, in the county of Mercer and State of New Jersey, have invented a new and useful Improvement in Cracker-Machines; and we do hereby declare that the following is a full, clear, and exact description of the same, reference being had to the accompanying drawing forming a part of this specification, in which—

Figure 1:
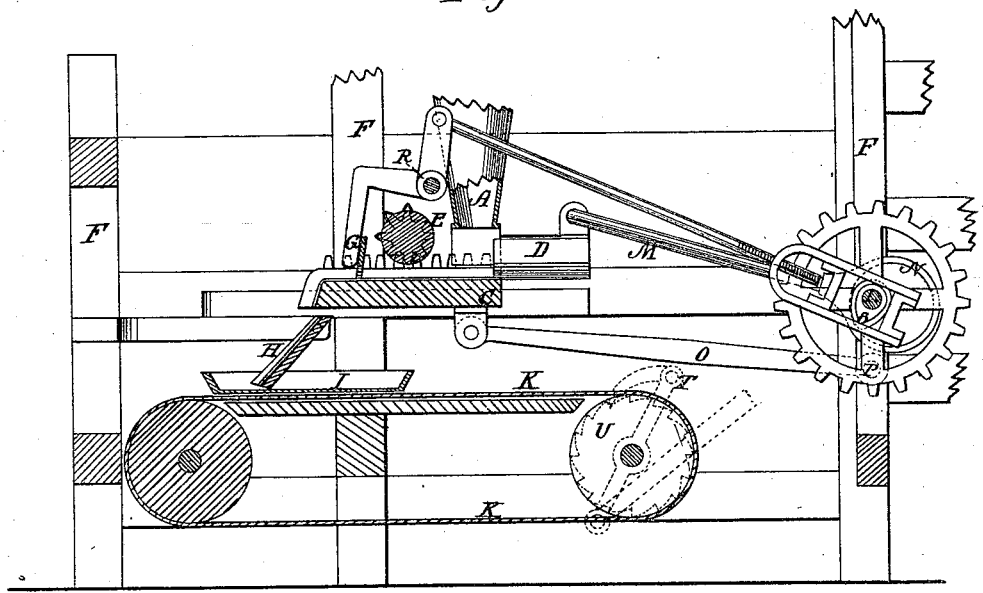
Figure 2:
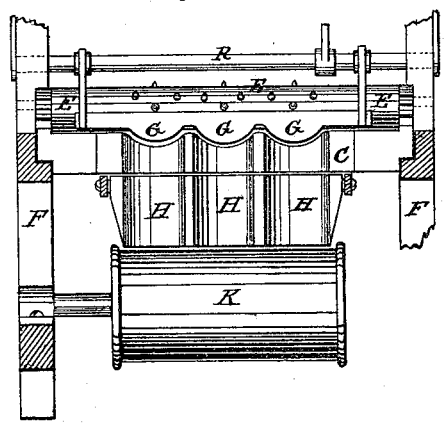

Figure 1 is a sectional elevation of the apparatus constituting our improvement, showing the grooved table in position to receive the crackers, and the sweep in the position necessary to clear the table and cause deposit of the docked crackers in the pan. Fig. 2 is an end elevation, with the frame of the machine in section, showing substantially the same arrangement of parts.

The invention relates to the improved means, hereinafter described, of docking and finishing crackers, and automatically transferring them to the baking-pans.

In another patent of the same date, we have given a general description of a machine, of which the subject of this patent may form a part.

The molded crackers are delivered to the vertical tubes A, (by means not here shown,) and are by them conveyed to and deposited upon the grooved and horizontally-reciprocating table C. A pusher, D, having ribs corresponding with the grooves of table C, is caused to deliver the crackers to the docking and finishing roller E, which has fixed bearings in the frame F. While the pusher is completing its forward movement to the left, as shown in the drawing, the table C begins to move in the same direction, and thus carries the crackers beneath the roller, which simultaneously revolves. The latter has docking-points on a portion of its periphery, so that the crackers are docked at the same time that they are being rolled and pressed into the desired finished shape. The effect of the rolling is to cause the dough to turn under at the edge of the crackers, and adhere thereat in such manner as will effectually prevent the crackers crumbing or breaking at the edge subsequent to baking, as they are liable to do when, instead of being rolled, they are simply subjected to a direct downward pressure by means of a flat plate, sometimes called a flattener.

The positive rotary movement of the docking-roller is caused by pinions keyed on its journals, which mesh with racks formed on or attached to the side edges of the table C. Hence the roller always rotates when the table moves, and in the same direction.

When the crackers pass out from beneath the docking and finishing roller E by the continuing movement of the grooved table C, the sweep G, which has been previously raised, is dropped upon the table behind the crackers, and the table then making its return movement to the right, the crackers are swept off the table down the inclined and grooved end portion thereof, and down the chute H. The latter consists of a hinged inclined board or plate, having grooves corresponding with those of the table C, and delivers the crackers into pans I, which are placed in succession on the horizontal intermittently-moving endless apron K.

As the apron moves the pans are carried along under the hinged chute, raising the same, and allowing its lower end to drop into them. Thus there is a practically constant delivery into the pans, without manual labor being required for any other purpose save supplying the empty and removing the filled pans.

It is important that the end of the table C be grooved or shaped as described, so that the crackers may be slid off the table and onto the chute without breaking the skin or injuring their shape.

The illustrated means of imparting the desired reciprocating movement to the pusher D and the table C are derived from the same rotating shaft L by means, respectively, of connecting-rod M and eccentric N, and connecting-rod O and cranks P.

The sweep G is attached to angle-arms of a rock-shaft, R, arranged horizontally above the roller E, and which is operated by a cam, S, on shaft L.

The intermittent movement of the apron K is derived from the pawl-lever T, which acts on a ratchet-wheel, U, on the shaft of one of the drums, over which the apron is stretched. (The parts T U are shown in dotted lines.)

We do not claim in this case the employment of a docking-roller; but

We claim—

1. In a cracker-machine, the combination, with a grooved reciprocating table, of the docking-roller E, having a reciprocating rotary motion, substantially as shown and described.

2. In a cracker-machine, the combination of a reciprocating table, C, a sweep operated so as to rise and fall, as described, and the inclined chute H, all arranged as shown and described.

3. In a cracker-machine, the hinged and inclined chute H and the horizontal traveling apron K, as shown and described.

ADAM EXTON.
JOHN EXTON.

Witnesses:
  WOODBURY D. HOLT,
  MOSES WILSON.